(12) United States Patent
Bansod et al.

(10) Patent No.: US 7,685,272 B2
(45) Date of Patent: Mar. 23, 2010

(54) APPLICATION SERVER EXTERNAL RESOURCE MONITOR

(75) Inventors: Aditya P. Bansod, Shanghai (CN); Kazimierz K. Gwozdz, Dublin, CA (US)

(73) Assignee: Microsoft Corporation, Redmond, WA (US)

( * ) Notice: Subject to any disclaimer, the term of this patent is extended or adjusted under 35 U.S.C. 154(b) by 1069 days.

(21) Appl. No.: 11/332,444

(22) Filed: Jan. 13, 2006

(65) Prior Publication Data

US 2007/0168496 A1 Jul. 19, 2007

(51) Int. Cl.
G06F 15/173 (2006.01)
G06F 15/16 (2006.01)
G06F 7/00 (2006.01)
G01R 31/28 (2006.01)

(52) U.S. Cl. .............. 709/224; 709/232; 707/104.1; 707/E17.12; 714/724

(58) Field of Classification Search .......... 709/202, 709/218, 219, 238, 232, 229, 230; 714/724; 707/104.1; 726/3, 26
See application file for complete search history.

(56) References Cited

U.S. PATENT DOCUMENTS

| | | | |
|---|---|---|---|
| 6,314,463 | B1 | 11/2001 | Abbott et al. |
| 6,823,382 | B2 | 11/2004 | Stone |
| 6,912,534 | B2 | 6/2005 | DeBettencourt et al. |
| 6,941,555 | B2 | 9/2005 | Jacobs et al. |
| 2002/0059429 | A1 | 5/2002 | Carpenter et al. |
| 2002/0124100 | A1* | 9/2002 | Adams ............... 709/232 |
| 2003/0055913 | A1 | 3/2003 | Harkin et al. |
| 2003/0135509 | A1 | 7/2003 | Davis et al. |
| 2003/0221002 | A1 | 11/2003 | Srivastava et al. |
| 2003/0236880 | A1 | 12/2003 | Srivastava et al. |
| 2004/0162901 | A1 | 8/2004 | Mangipudi et al. |
| 2005/0160335 | A1* | 7/2005 | Peterson .............. 714/724 |
| 2006/0248118 | A1* | 11/2006 | Curtis et al. ......... 707/104.1 |

FOREIGN PATENT DOCUMENTS

WO WO 2005/071560 A1 8/2005

OTHER PUBLICATIONS

F5 Networks, Inc., Introducing Big-IP Load Balancing For BEA WebLogic Server, http://www.f5.com/solutions/deployment/weblogiclb_bigip9_dg.html, 2005.
Oracle, Oracle Enterprise Manger 10g Grid Control, Oracle Data Sheet, http://www.oracle.com/pls/wocprod/docs/page/ocom/technology/products/oem/pdf/fov_10g1.pdf, Aug. 15, 2003.
Sun Microsystems, Inc., iPlanet Directory Access Router Administrator's Guide—Overview of iDAR, http://docs.sun.com/source/816-5578-10/overview.htm, 2001.
Jie Wang, Towards An Automatic IT Infrastructure Management Paradigm for Manufactory and Enterprise, http://eil.stanford.edu/publications/jie_wang/ICMA2003-Jie.pdf, Stanford University, California, 2004.

* cited by examiner

*Primary Examiner*—Melanie Jagannathan
*Assistant Examiner*—Stephanie Chang
(74) *Attorney, Agent, or Firm*—Vierra Magen Marcus & DeNiro LLP

(57) ABSTRACT

A backend server process monitor operates application servers accessing resources on backend servers. The monitor tracks failures, latency and errors at an interval. A method includes monitoring a plurality of resource requests from the application sever to a backend server and determining whether each of the plurality of resource requests was completed successfully and within a specified latency by the backend server. Errors on a server are tracked and the method includes notifying an application on the application server that a problem exists with the backend server.

17 Claims, 6 Drawing Sheets

```
OPERATION (Event name)
DATA:
--Store (Location)
--Cluster (Location)
--Partition (Location)
REQUEST TIME
```

FIG. 6B

```
OPERATION (Event name)
DATA:
--Store (Location)
--Cluster (Location)
--Partition (Location)
SUCCESS (flag)
DURATION (time)
```

FIG. 7

APPLICATION SERVER EXTERNAL RESOURCE MONITOR

BACKGROUND

Large scale Internet applications are generally provided by service providers through a series of application and data servers. As demand for the service increases, service providers desire to increase the capacity of their systems while maintaining a manageable environment. Providing large scale applications causes unique problems in monitoring the health of the application and data servers. In particular, multiple-tier applications where the front end tier is accessible to the general public pose an even more unique problem as there is no upper bound to the amount of load that can be exercised by the public on the system.

Large scale internet application developers have encountered resource problems when the load on the overall system becomes very large. In come cases, the load on the system can become so large that it begins to magnify itself and leads to generalized failures to users across the service. This can exhibit itself in multiple ways. One faulting component can destabilize the entire environment. Large levels of load can expose bugs (from application to operating system to hardware) that are only caused under these conditions. Multiple faulting components can destabilize the entire environment.

Most operating systems and servers provide the ability to monitor events in some fashion. Perhaps most familiar are operating system event monitors which check operating system events and provide feedback to a system administrator. Generally, application servers make requests—read, write, DNS and the like—to other servers in large scale application environments. Some such environments support event monitoring between the servers and include the ability to report on inter-server events.

Improvements in providing large scale application services provide benefits to users.

SUMMARY

Technology for monitoring resource request events external to an application server is described herein. The technology includes a backend server process monitor operating on application servers which access resources on backend servers. The monitor tracks, failures, latency and errors at an interval. This external event monitor allows each application server to perform its own compensation for errors occurring external to the server. Consequently, application servers are more easily scalable and components which generate failures within the system do not affect application servers. Events can be defined with a course or fine level of granularity.

In one aspect, the technology includes a method implemented at least in part by a computing device comprising an application server. The method includes monitoring a plurality of resource requests from the application sever to a backend server and determining whether each of the plurality of resource requests was completed successfully and within a specified latency by the backend server. For each unsuccessful or slow response to a resource request, an addition is made to an event tracking monitor watch list. The method may further include the step of notifying an application on the application server that a problem exists with the backend server.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Technology for monitoring resource request events external to an application server is described herein. The technology allows application developers using application servers to incorporate information about resources available on other servers providing support to the application server to determine levels of service to application users, based on the availability of such external resources.

A backend server process monitor operates on application servers which use the resources of the backend servers. The monitor tracks failures, latency and errors at an interval. This external event monitor allows each application server to perform its own compensation for errors occurring external to the server. Consequently, application servers are more easily scalable and components which generate failures within the system do not affect application servers. Events can be defined with a varying degree of granularity. At any point in time, one can calculate the determine the error level for a particular backend and take action accordingly.

Figure 1:
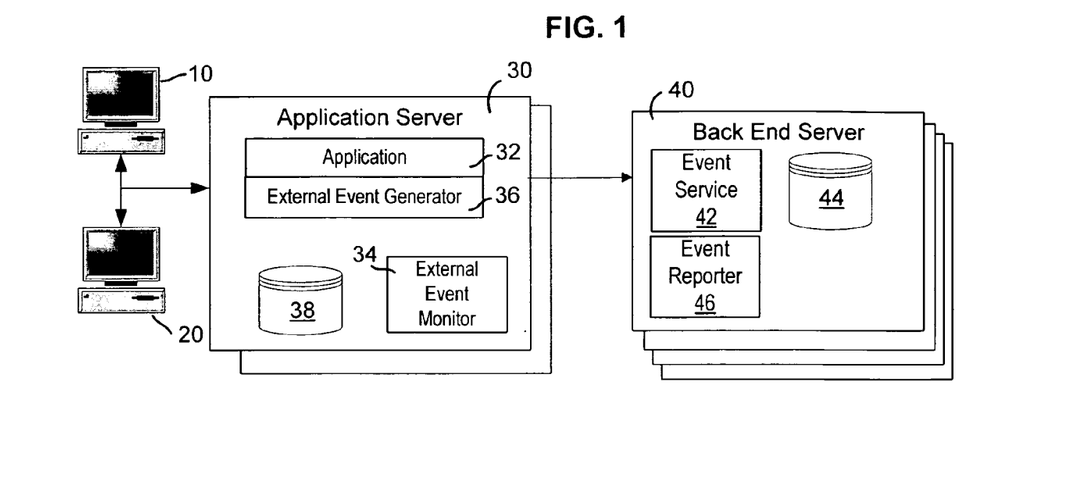
FIG. 1 depicts an exemplary environment in which the technology disclosed herein is practiced.

FIG. 1 illustrates an exemplary environment in which the monitoring technology can be implemented. FIG. 1 illustrates an application server 30 which may have one or more applications 32 each including an external event resource generator 36 and an external event monitor 34. The application server 30 includes an event log 38 to which an operating system and any applications on application server 30 may write events.

Generally, application server 30 provides functional services to users 10, 20 operating client computers 10, 20. In one embodiment, as discussed below, an application server may be one or more components of a web service, such as a web based e-mail service including, for example, Hotmail, Yahoo Mail or AOL Mail. The application servers are accessed by users 10, 20.

Any number of application servers may interact with any number of backend servers 40. Application servers themselves require one or more services and functions typically provided by each backend server 40. An event generator 36 issues requests for tasks and services to one or more of the backend servers 40. In response to the request, the backend server performs the requested task and may also return success or failure information to the application server.

Examples of such events may include retrieving data from the backend server, writing data to the backend server, retrieving user or other data from the backend server, and the like. The particular type of requests responded to vary in accordance with the application that is provided to the users 10, 20.

The terms "application" server and "backend" server are used to generally describe the functions of servers 30 and 40, respectively. It should be recognized that the terms do not denote any particular physical or functional location of the servers. The technology is directed to any request made by a processing device (virtual or physical) to another processing device. In this case, the server may, in one embodiment, be a virtual server and multiple application servers can be hosted on one processing device. An example of a processing device suitable for implementing the technology discussed herein is disclosed with respect to FIG. 7.

The external event monitor 34 tracks the success, failure, and response times associated with responses to requests for resources generated by the external event generator 36. For example, in an e-mail environment, an application 32 may request a "read e-mail" event from a backend server. In such a case, an event service 42 will extract e-mail data from a data store 44 on the backend server and return this data to the application 32. An event reporter service 46 may also make available an event report to the application server indicating a success. If the event service 42 fails, a failure report may be provided by a reporter 46. In come cases, no event reporter 46 is present and event monitor 34 must track event status, as discussed below.

Failure of an event request to a backend sever may result in an error in the application 32 which may become apparent to the user. The error may appear as slow performance or the inability to perform an application task. Failures may result from a physical hardware failure of the backend server, capacity issues on the backend server, or for numerous other reasons.

Using the technology of the external event monitor 34, application 32 can track whether a failure has occurred, or whether the event has taken too long to occur. With knowledge of whether a request generated by an event generator 36 has either failed or taken too long, the external event monitor 34 can allow applications 32 to take additional measures in accordance with the decisions of the application developer. Events may be monitored and actions taken by the application based on the type of event monitored. For example, an email application may decide that write failures (or slowness) on a particular backend server which stores email for a number of users should result in preventing users from creating new email messages. However, if no read failures (or slow reads) are detected, users may be allowed to access email stored on the same server.

The backend monitor 34 operates on each application server and tracks latency and errors. Events can be defined with a course or very fine level of granularity. For example, events can be defined to an operation and storage level, or can be grouped into types of operations. For example, all write events to a particular location or all read events from a particular location can be grouped together. Each of the watched backend servers keeps track of all the failures that happen for that particular backend. This includes when it occurred and what severity. At any point in time, one can calculate the cumulative severity for that particular backend.

It will be understood that the event monitor 34 may be provided on each application server 30 as a separate application, as a component of the operating system, or as a component of a shared service providing event reporting to multiple application servers. In the case where the event monitor 34 is provided on each application sever 30, an advantage results in that individual servers monitor the status of all external events and allow the applications running thereon to make decisions about how to deal with the event slowness or failures. This allows for easier scaling of the service when adding additional application servers.

Figure 2A:
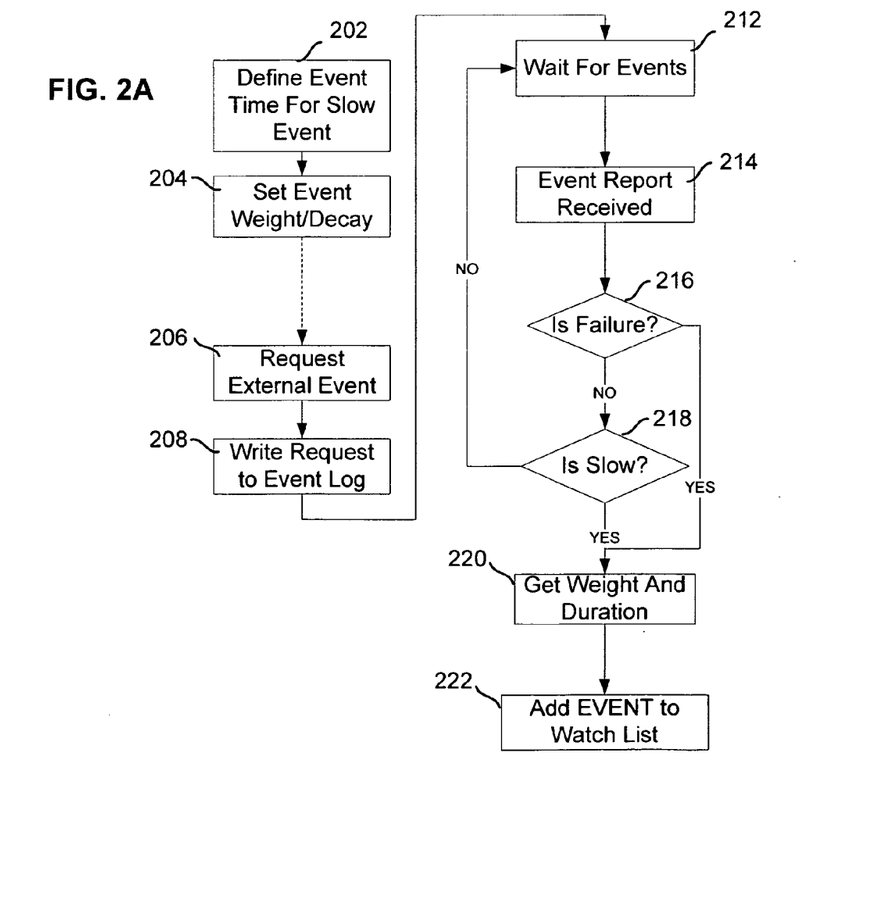
FIG. 2a depicts a method for requesting an event in the technology described herein.

In one implementation, events monitor 34 needs to keep track of information requests to backend resources and whether those events are successful. FIG. 2A represents a method operable by the event monitor when a request is made. At step 202, a definition for a slow event is set. The definition may comprise a time selected by a system administrator for the application server during over which an event is flagged as occurring slowly. At step 204, a relative importance for a particular event may be set. The importance may have two components: a weight and a time decay value. These values are used by the event monitor to determine whether a backend system is experiencing a problem which requires alerting applications 32. The process for selecting when an error actually is occurring on a backend system is discussed below with respect to FIG. 3. In one embodiment, steps 202 and 204 may be implemented by the event monitor reading a configuration file storing the weight and decay time for all events generated by event generator 36.

At a separate point in time as indicated by the dashed line between steps 206 and step 204, external event generator 36 may request a service or data from a backend server 40. When this occurs, the request may be written to an event log at step 208. In a case where the backend server does not report information on events requested by it, the event monitor can interact with the application to determine whether the event request was responded to successfully and the duration of the event request. In this case the record written to the event log 208 may appear as that shown in FIG. 6A.

Figure 6A:
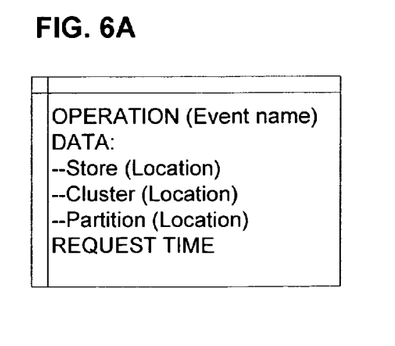
FIG. 6A depicts an event record for an event request on a server.

In FIG. 6A, each event includes an operation or event name, data indicating the location of the event, and a request time. This information can be used to track the event. In one embodiment, the event is defined in terms of both they type of operation (Read, Write, etc.) and the location of the event (i.e. what backend server or a particular location within the backend server) where the event occurs.

Alternatively, the backend server may include the capability to provide reporting on event requests (via a reporter 46), or another mechanism (such as a global system provider event monitoring service) may be in place to provide event reporting to the event monitor. In this latter case, an event record such as that appearing in FIG. 6B may be provided.

At step 212, the process will wait for an event report from the backend server 40 or the application 32, indicating whether an event request generated by the external event generator 36 has been completed. An incomplete event constitutes a failure. If the latency of the request is too great, a slow process may have occurred.

Next, at step 214, an event notification is received. At step 216, a determination is made as to whether the event is a failure. In the case where external event reporting is supported, this may include reading a failure flag in the record of FIG. 6b. A failure flag will indicate that the external event to the application server did not complete successfully. If no failure has occurred, then at step 208, a determination is made as to whether a successful event took longer than a defined "slow" time. The time period which is under consideration for whether an event is slow or not may be determined by a system administrator using a configuration setting as discussed above.

If an event is neither a failure nor a slow event, the system returns to step 212 and waits for additional events to be received. If a failure or a slow event is received, then the relative weight and decay duration is retrieved at step 220 and the event is added to a watch list 222. The watch list is maintained by the external event monitor 34 in a data store. 38.

The nature of the particular event tracked can vary based on the type of backend server and the application server communicating with the backend server. As discussed below, where the backend server and application server are part of a service provider's system for providing a multitude of services to users, events may be defined in accordance with their physical location and function.

Figure 2B:
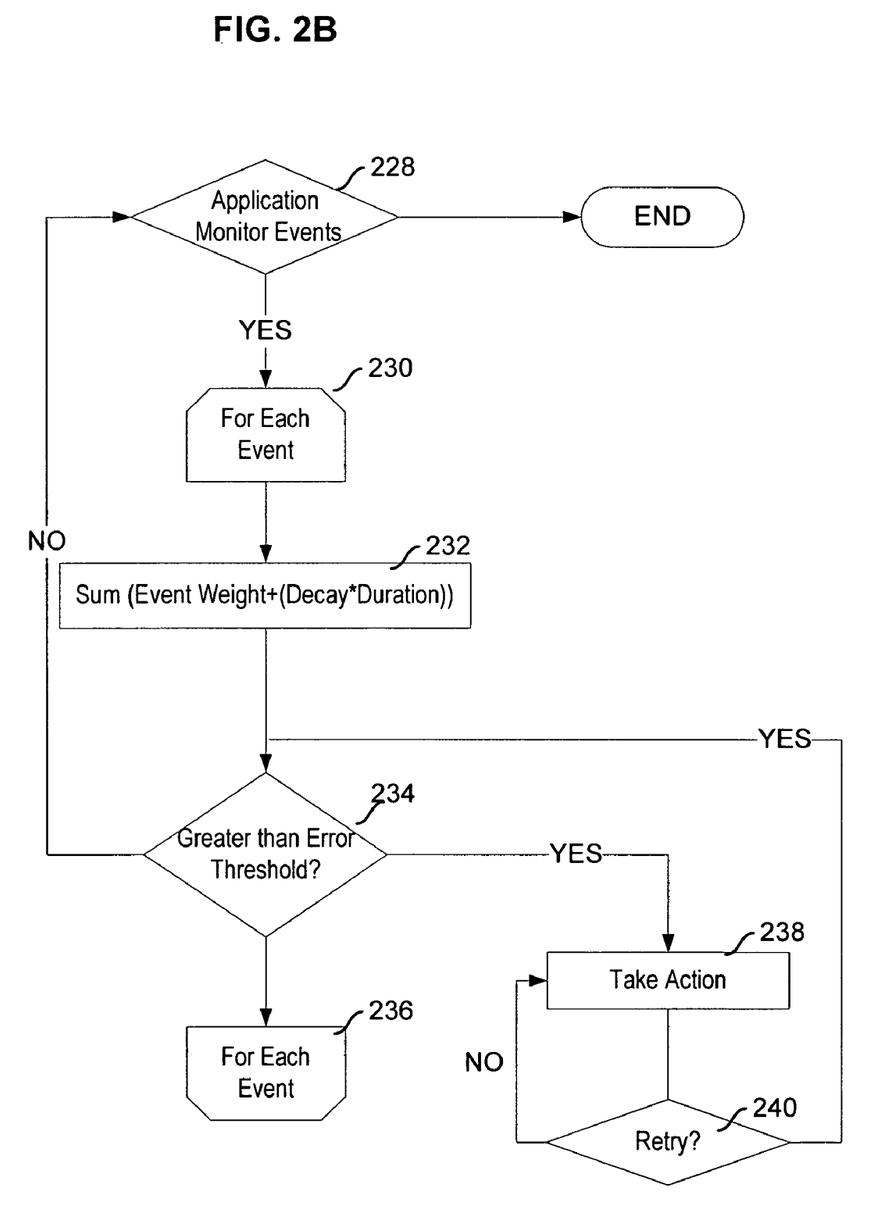
FIG. 2b depicts a method for monitoring an event.

FIG. 2B represents the interaction between an application and the event monitor which generates an error notification to the application. The choice to use data from the event monitor is left with the application designer. The developer may decide to monitor external events occurring on backend servers to determine whether such events indicate a problem with the backend server, and utilize this information to provide notifications to human administrators, or to allow the application to make its decisions about how it wishes to handle such problems. For example, if known problems exist with certain events on certain servers, the application can choose to deny access to application functions related to such events until such time as errors associated with the event have been cleared.

At step 220, if an application designer has determined that an application should monitor events, then at a predetermined interval or at preprogrammed times, for each event being monitored on the event monitor watch list 230, at a given point in time, at step 232 the method calculates the sums of each watched event's weight as reduced by the decay value associated with the particular event and if the sum of these values exceeds a particular threshold, then at step 236 the application takes action at step 238. If the sum of these errors is below a particular threshold then the application simply continues to monitor events. If the calculation indicates an error (over the threshold weight), the application can take action at step 238. The types of actions taken vary in accordance with the applications, as discussed above. In a further aspect, after some interval of time, a retry interval may be set at step 240 to determine whether the external events are now functioning. In this context, functioning means that the error threshold calculation is not exceed. For example, if a backend server experiences a reboot, the error threshold will be exceeded. However, as the server comes back on line, errors form requests will be ceased and the threshold calculation will go down due to the decay value of the event weights set above in step 204.

Figure 3:
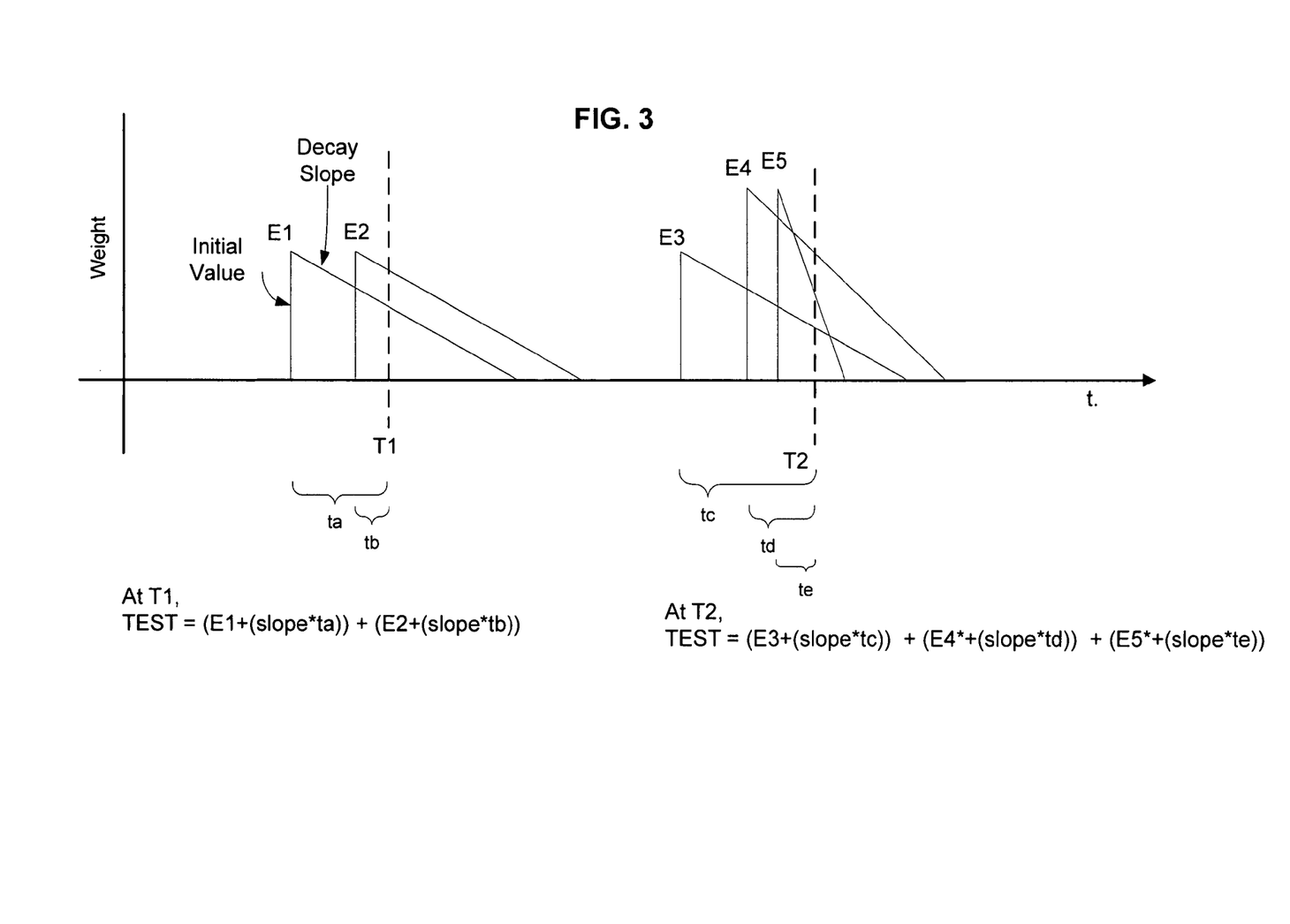
FIG. 3 depicts two examples of monitoring calculations in accordance with the technology described herein.

The calculation set forth at step 232 is illustrated with respect to FIG. 3. FIG. 3 illustrates a graph of the weight of errors E1, E2, E3, E4 and E5 with respect to time. Dashed lines T1 and T2 indicate calculation points at which the event monitor may check for an error in the watched event as in step 232.

As noted above, each error has an initial value or weight and a decay value over time. That is, when an error initially occurs, an error has an initial value or weight associated defined by a system administrator in a configuration file. The decay value is a reduction of weight of an error over time, (a negative slope) so that after some length of time the affect of the error on the calculation to determine whether a backend system is experiencing a problem is reduced to zero. In this manner, the system administrator can determine the relative weights of different types of errors and how severe the value of these errors will affect the system.

In the example shown in FIG. 3, errors E1 and E2 have a initial weight values which are approximately equal. In addition, their decay slope is approximately equal. At time T1, the relative weight of error E1 has decayed to approximately one half of its initial value due to the passage of time T. E2, on the other hand, has approximately four-fifths of its initial value having occurred later in time than E1. At time T1, when watched events are summed, if E1 and E2 are the only two errors which have occurred, then the calculation 232 results in a value defined by the equation (E1+(decay slope*elapsed time)) plus (E2+(decay slope*elapsed time)). Note that the decay slope will be negative, actually reducing the value of the error weight E1 and E2. If this sum is above the error threshold, then an error will be indicated with the backend server.

As illustrated by errors E3 through E5 in FIG. 3, the relative weights and decay slopes of each type of error can vary. Error E3 has an initial value and decay slope similar to that of errors E1 and E2. Errors E4 and E5 have a much greater initial value but a much more severe decay slope. Hence, the value calculated by step 232 at time T2 will be the sum of the time adjusted values of the weights of E3, E4 and E5.

The scale of weights and thresholds may be arbitrary. For example, weights may be set on a scale of 1-10 with the threshold calculation set as some integer value. The threshold may be set below 10, which would generate an error if the calculation occurs within a time close to error reporting. Typically, in this example, the threshold will be set at some value above 10, which reflects the system's sensitivity to external errors as determined by the system administrator.

In addition, where in one embodiment an "error" is not signaled by the event monitor until a sum of multiple events is used, it should be recognized that once a threshold sum of weights is used, an application may choose to use all the information from the event monitor on all errors being reported by the monitor to take action. In addition, the configuration discussed herein may weight the type of event response (failure versus slow) differently, and reactions taken based on the type of failure mode seen.

Figure 4:
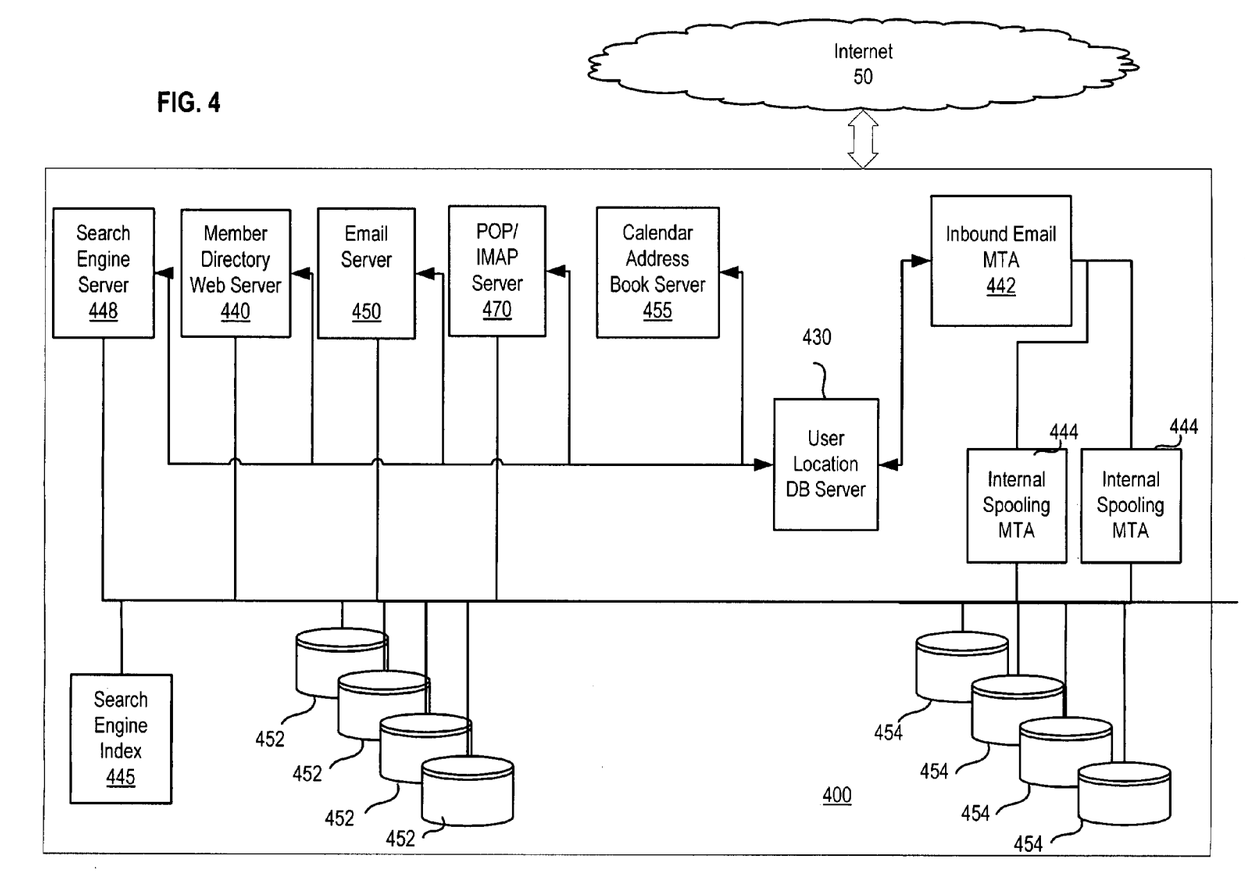
FIG. 4 depicts a second exemplary environment in which the technology disclosed herein may be practiced.

FIG. 4 illustrates an exemplary system 400 in which the external event monitor may be utilized. System 400 may be implemented by a system service provider to provide a multitude of services to users, such as email, a search service with user stored searches, a member directory and an address book and calendar service. The system 400 may include, for example, an inbound e-mail mail transfer agent (MTA) 440, a user location database server 430, user data storage units 452, 454, an e-mail server 450, a POP/IMAP server 470, a member directory web server 440, an address book and calendar application sever 445, and a search engine application server 448. Inbound e-mail MTA 440 is essentially a front end server to which e-mails are transmitted via the internet or other suitable network. The user location database server 430 is a data storage location affirmation for each of the users having a user account or e-mail address within the system. The user location database server stores information to allow other servers in this system to direct mail or other services such as contact books or saved search data within the system to store its location on storage units 454, 454 based on the routing instructions in this system. Storage units 454 and 454 are essentially large disk arrays which can be accessed by reference to an IP address in this number. Users connect through any of the application servers through any of a number of public and private networks, including internet 50.

Each of the application servers such as search engine server 448, member directory web server 440, e-mail server 450, POP/IMAP server 470, e-mail transfer agent 440, may utilize other servers in the system to provide services to the end user. For example, the user location database server 430 directs the application servers to location on the storage units 454, 454 where user information is stored. Internal spooling mail transfer agents 444, 444 direct emails within the system from the inbound email MTA to the storage units. The search engine index 455 provides result information to the search engine server 448. Events generated by the application servers 448, 440, 445, 450, 470, and 440 are responded to by the backend servers 455, 444, 444, 454, 454

Figure 5:
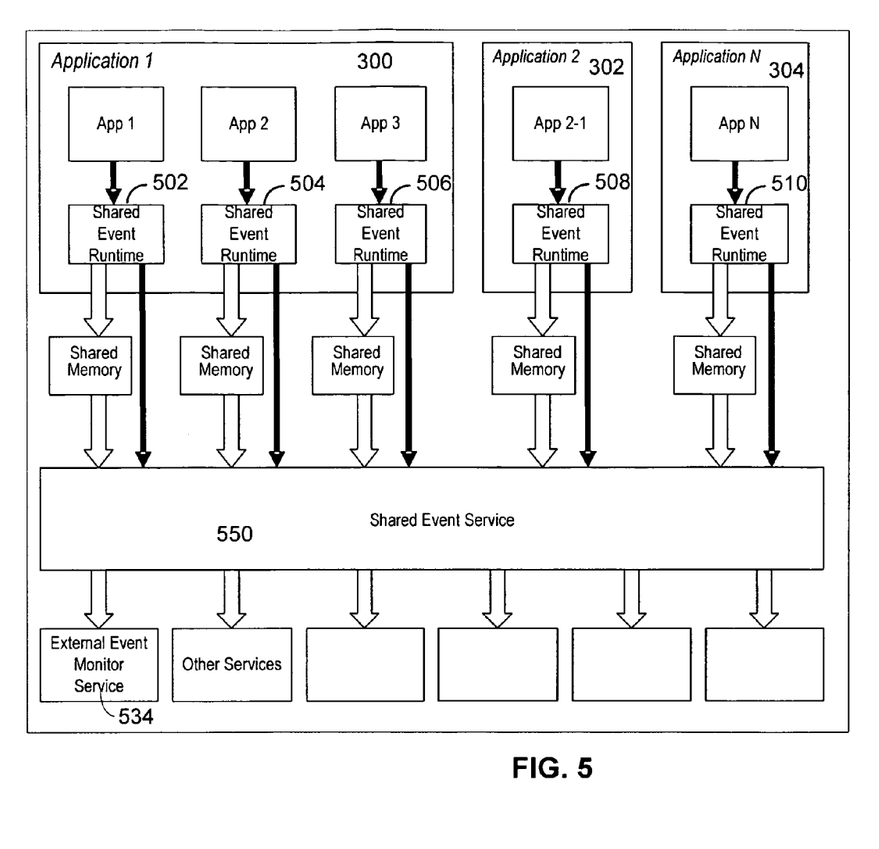
FIG. 5 depicts a server environment for the servers depicted in FIG. 4.

An exemplary application server shown in FIG. 5. FIG. 5 illustrates one type of application server suitable for implementing the application servers discussed above with respect to FIG. 4. FIG. 5 shows an application server running a shared event service wherein a number of applications running on the server can interact using a shared memory. This shared event service shows one implementation wherein the event monitor functions are separated from the applications.

The shared event service may include a shared memory pool accessible to which any application can insert data.

All the tools that are available to review data in the shared service are accessible to all applications using the shared memory. Shared memory is a method by which program processes can exchange data more quickly than by reading and writing using the regular operating system services. Using a designated area of shared memory, data can be made directly accessible to both processes without having to use the system services.

When an application (Application 1, Application 2, Application N) running in this environment starts, it may initialize a shared event runtime 502, 504, 506, 508, 510. The runtime connects the applications to a shared event service 550. Applications may raise instrumentation events within the service which can then be used by other applications. Events represent one type of data defined the application. As noted above, events originate at a known place at a particular time. Events can be distributed to destinations inside and outside of the application. In this type of application server, the external event monitoring service 34 is configured as one type of plug-in which communicates to the shared event service through an application program interface (API). Hence, applications within the application server will share event information with the event monitor and with other applications in the server.

Figure 6B:
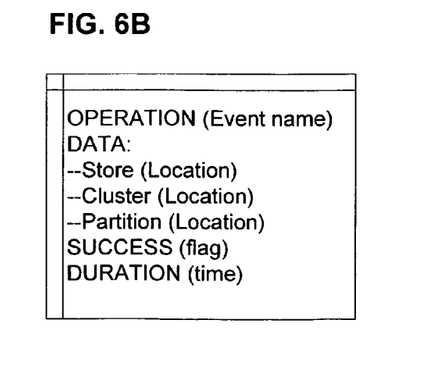
FIG. 6B depicts an event record received in an environment wherein external request event reporting is supported.

FIGS. 6A and 6B show exemplary data records stored by the event monitor 34 or provided by an event reporter 46 within the technology disclosed herein. In the context of the system of FIG. 4, for example, events may be defined in terms of physical locations. For example, storage units 452 and 454 may include a number of physical clusters and data partitions within the cluster. In this example shown in FIG. 6A, the data record defines the event in terms of a cluster, operation and partition. FIG. 6B illustrates data record reported by an event reporter 46. Each record of this type may likewise includes the operation or event name, data on the particular type of operation including the particular store, cluster, and partition especially in the instance of the invention as disclosed with respect to FIG. 4, whether the operation was a success and the duration between the event's initiation and the event's successful completion.

It will be recognized that locations may include other identifiers. For example, in some systems, servers may communicate using the Simple Object Access Protocol (SOAP). In such case, the location may be defined as a SOAP end point.

Figure 7:
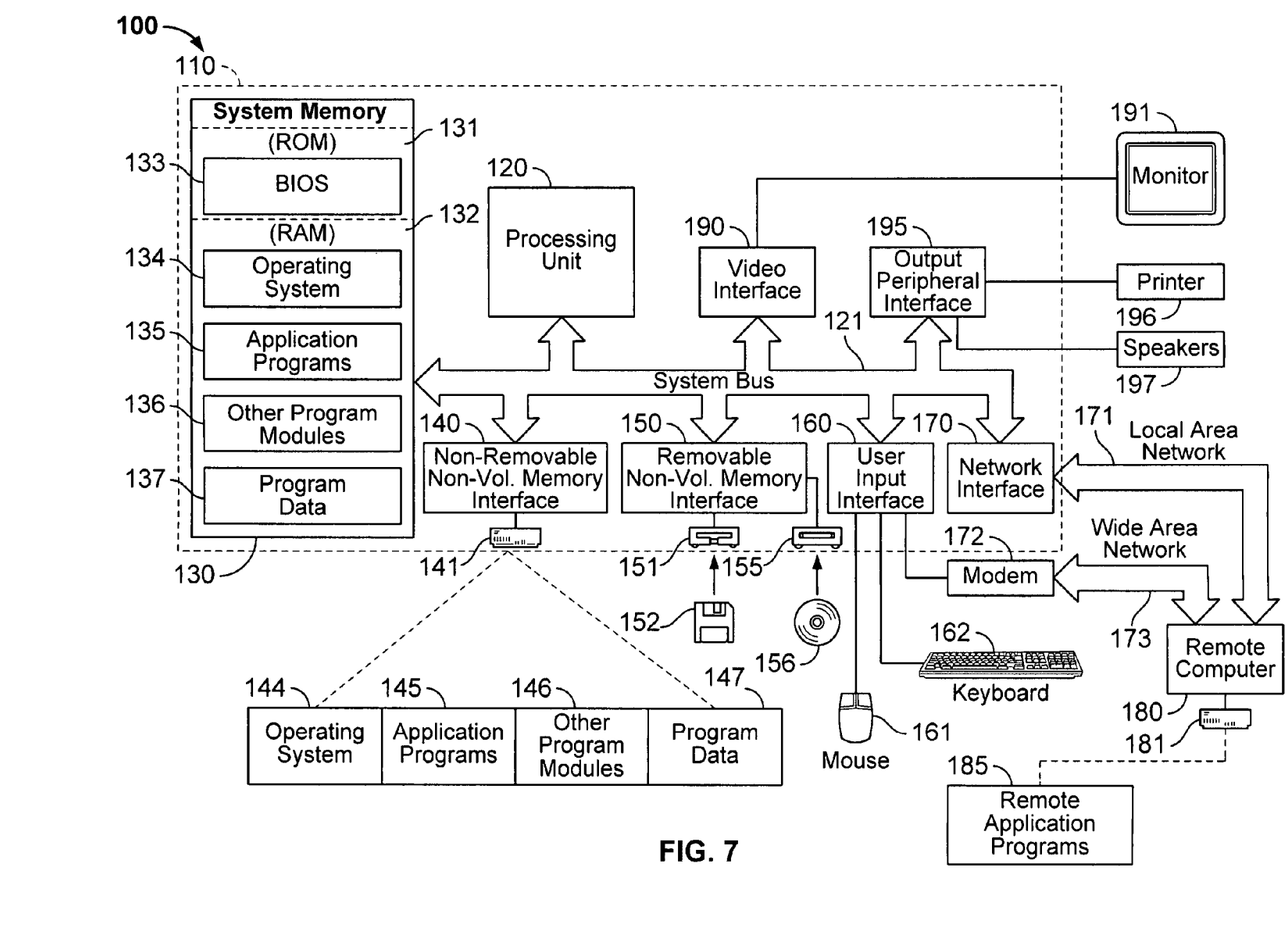
FIG. 7 depicts a processing device suitable for implementing computers, servers and other processing devices in accordance with the present invention.

FIG. 7 shows an exemplary processing system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 7, provide storage of computer readable instructions, data structures, program modules and other data for the computer 110. In FIG. 7, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 3 illustrates remote application programs 185 as residing on memory device 181. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method implemented at least in part by a computing device, comprising:
   monitoring a resource request from the computing device to an external resource;
   determining whether the resource request was successfully completed and generating an error if the request fails;
   determining whether a response time of a response to the resource request was greater than a maximum latency, and generating an error if the latency is greater than the maximum; and
   tracking errors associated with the external resource;
   determining whether a time weighted sum of errors has exceeded a specified value by assigning each error type an initial weight and a decay rate, and summing the initial weight less the decay rate multiplied by time of all tracked errors.

2. The method of claim 1 further including the step of notifying an application that a problem exists with the external resource.

3. The method of claim 2 wherein the step of notifying includes determining that the time weighted sum of errors has exceeded a specified value.

4. The method of claim 3 wherein the step of notifying includes performing said step of determining a time weighted sum for each of a number of resource request types on a watch list.

5. The method of claim 1 wherein the method includes the further step of defining a maximum latency indicating a slow response, thereby indicating an error on the external resource.

6. The method of claim 1 wherein the method includes the step, prior to said step of outputting, of generating a watch list for an error responsive to said determining step.

7. The method of claim 1 wherein the method further includes specifying an response as including a location on the external resource.

8. The method of claim 1 further including the step of notifying an application that a problem exists with the external resource and further including:
   denying access to the external resource;
   repeating the step of determining and tracking errors after an interval; and
   allowing access to the external resource if a time weighted sum of errors has not exceeded a specified value.

9. A method implemented at least in part by a computing device comprising an application server, comprising:
   monitoring a plurality of resource requests from the application sever to a backend server;
   determining whether each of the plurality of resource requests was completed successfully and within a specified latency by the backend server;
   for each unsuccessful or slow response to a resource request, adding an event tracking monitor to a watch list;
   tracking errors associated with each event on the watch list; and
   determining whether a time weighted sum of errors has exceeded a specified value by assigning each error type an initial weight and a decay rate, and summing the initial weight less the decay rate times time of the tracked errors.

10. The method of claim 9 further including the step of notifying an application on the application server that a problem exists with the backend server.

11. The method of claim 10 wherein the step of notifying includes notifying the application server of whether the error is a latency error or a failure error.

12. The method of claim 11 further including the step of summing time weighted values for events on a watch list and the step of notifying is performed when a sum of said time weighted events exceeds a threshold.

13. The method of claim 9 wherein the method is performed on each of a plurality of application servers for each of a plurality of backend servers.

14. A computer-readable medium in a computer having computer-executable components, comprising:
 (a) one or more service applications including a resource request generator outputting requests for resources from one or more backend servers external to a processing device containing the computer readable medium; and
 (b) a request monitoring component determining whether each of the resource requests was completed successfully and within a specified latency by the backend server; including a notification component communicating with the service applications, including a configuration file including a threshold weight sum above which the notification component provides an error notification with the backend server, the threshold weight sum comprising a time weighted sum of errors exceeding specified value, the time weighted sum comprising a sum of weight values of all errors where each error has an assigned initial weight defined by error type an initial weight and a decay rate, and the weight value comprising the initial weight less the decay rate multiplied by time for each error he tracked errors.

15. The computer readable medium of claim 14 further including a configuration file including a time dependent weight associated with a type of resource request.

16. The computer readable medium of claim 14 further including a configuration file including a threshold weight sum above which the notification component provides an error notification with the backend server.

17. The computer readable medium of claim 16 wherein a notification is provided when a time dependent weighted sum of all events on a backend server exceeds a threshold weight.

* * * * *